(12) United States Patent
Ahn

(10) Patent No.: US 11,340,866 B2
(45) Date of Patent: May 24, 2022

(54) ELECTRONIC APPARATUS AND METHOD FOR CONTROLLING THEREOF

(71) Applicant: SAMSUNG ELECTRONICS CO., LTD., Suwon-si (KR)

(72) Inventor: Joon-young Ahn, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 118 days.

(21) Appl. No.: 16/168,408

(22) Filed: Oct. 23, 2018

(65) Prior Publication Data
US 2019/0138272 A1 May 9, 2019

(30) Foreign Application Priority Data
Nov. 6, 2017 (KR) ........................ 10-2017-0146934

(51) Int. Cl.
*G06F 3/16* (2006.01)
*H04N 21/4223* (2011.01)
(Continued)

(52) U.S. Cl.
CPC ............ *G06F 3/167* (2013.01); *G06F 1/1605* (2013.01); *G10L 15/08* (2013.01); *G10L 15/22* (2013.01); *H04N 21/4223* (2013.01); *H04N 21/42201* (2013.01); *H04N 21/43615* (2013.01); *H04N 21/44218* (2013.01); *H04R 1/04* (2013.01)

(58) Field of Classification Search
CPC ... G10L 15/22; G10L 2015/223; G10L 17/22; G10L 15/08; G10L 15/00; G06F 3/167; G06F 21/32; G06F 3/165; G06F 3/16; G06F 1/1605; H04N 21/43615; H04N 21/42201; H04N 21/4223; H04N 21/44218; H04N 21/42203; H04N 21/43637;
(Continued)

(56) References Cited

U.S. PATENT DOCUMENTS 10,546,583 B2 * 1/2020 White .................... G10L 25/84
2007/0135098 A1 6/2007 Sampath
(Continued)

FOREIGN PATENT DOCUMENTS

EP 2950550 A1 12/2015
EP 3104574 A1 12/2016
(Continued)

OTHER PUBLICATIONS

Communication dated Apr. 12, 2019, from the European Patent Office in counterpart European Application No. 18185229.4.
(Continued)

*Primary Examiner* — Angela A Armstrong
(74) *Attorney, Agent, or Firm* — Sughrue Mion, PLLC

(57) ABSTRACT

An electronic apparatus and a method for controlling thereof are provided. The electronic apparatus includes a microphone configured to receive a user voice, a communication interface, and a processor configured, based on a first voice being received through the microphone, to provide first response information corresponding to the first voice, and based on a user sensing signal being received from an external apparatus through the communication interface, to control the communication interface to send the first response information to the external apparatus.

16 Claims, 16 Drawing Sheets

(51) Int. Cl.
*H04N 21/436* (2011.01)
*H04N 21/422* (2011.01)
*H04N 21/442* (2011.01)
*G06F 1/16* (2006.01)
*G10L 15/08* (2006.01)
*G10L 15/22* (2006.01)
*H04R 1/04* (2006.01)

(58) Field of Classification Search
CPC .. H04N 21/4394; H04N 21/4524; H04R 1/04; G06K 9/00221; H04W 4/02; H04W 4/029
See application file for complete search history.

(56) References Cited

U.S. PATENT DOCUMENTS

| | | | |
|---|---|---|---|
| 2011/0129196 A1 | 6/2011 | Hayashi | |
| 2013/0279706 A1* | 10/2013 | Marti | G06F 3/165 381/57 |
| 2015/0128194 A1 | 5/2015 | Kuang et al. | |
| 2015/0135218 A1 | 5/2015 | You et al. | |
| 2015/0350590 A1* | 12/2015 | Micewicz | H04N 21/4516 386/230 |
| 2016/0037209 A1 | 2/2016 | Miyoshi | |
| 2016/0353218 A1* | 12/2016 | Starobin | G06F 3/0488 |
| 2017/0186428 A1* | 6/2017 | Kunitake | G06F 3/167 |
| 2017/0187852 A1 | 6/2017 | Baek et al. | |
| 2017/0208363 A1 | 7/2017 | Glazier et al. | |
| 2017/0242651 A1* | 8/2017 | Lang | G06F 3/165 |
| 2017/0242657 A1* | 8/2017 | Jarvis | G06F 3/165 |
| 2018/0358009 A1* | 12/2018 | Daley | G06F 3/167 |
| 2019/0179605 A1* | 6/2019 | Stefan | H04R 1/1041 |

FOREIGN PATENT DOCUMENTS

| | | |
|---|---|---|
| JP | 2015-039094 A | 2/2015 |
| JP | 2015-186024 A | 10/2015 |
| KR | 10-2012-0119894 A | 10/2012 |
| KR | 10-1495297 B1 | 2/2015 |
| KR | 10-2016-0065719 A | 6/2016 |

OTHER PUBLICATIONS

Communication dated Jan. 22, 2019, from the European Patent Office in counterpart European Application No. 18185229.4.
Communication dated Apr. 16, 2020 from the European Patent Office in application No. 18185229.4.
Communication dated Jan. 11, 2021 by the European Patent Office in counterpart European Patent Application No. 18185229.4.
Laroche et al., "RD Optimized Coding for Motion Vector Predictor Selection," IEEE Transactions on Circuits and Systems for Video Technology, vol. 18, No. 9, pp. 1247-1257, Sep. 2008, XP011231739.
Jung et al., "Competition-Based Scheme for Motion Vector Selection and Coding," ITU—Telecommunications Standardization Sector, Study Group 16 Question 6, Video Coding Experts Group (VCEG), 29th Meeting in Klagenfurt, Austria, Jul. 17, 2006, Document VCEG-AC06, Total 7 pages, XP030003490.
Han et al., "Improved Video Compression Efficiency Through Flexible Unit Representation and Corresponding Extension of Coding Tools," IEEE Transactions on Circuits and Systems for Video Technology, vol. 20, No. 12, pp. 1709-1720, Dec. 2010, XP011329409.
Tourapis et al., "Direct Mode Coding for Bipredictive Slices in the H.264 Standard," IEEE Transactions on Circuits and Systems for Video Technology, vol. 15, No. 1, pp. 119-126, Jan. 2005, XP011124673.
Communication dated Aug. 2, 2021, issued by the European Patent Office in counterpart European Application No. 18185229.4.
Communication dated Mar. 16, 2022 issued by the Korean Patent Office in application No. 10-2017-0146934.

* cited by examiner

FIG. 4B
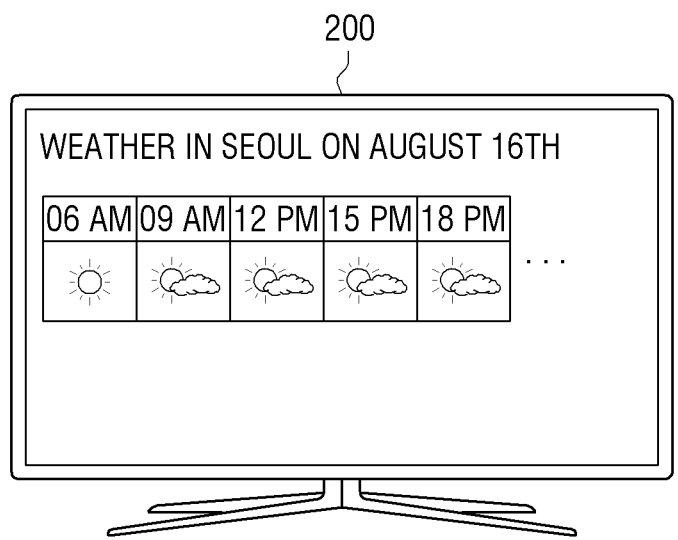
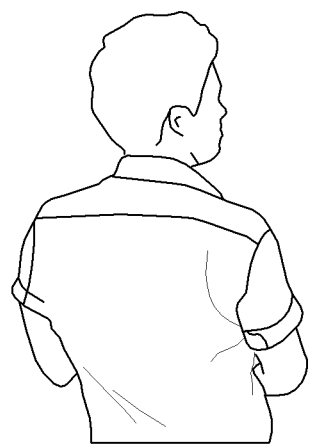

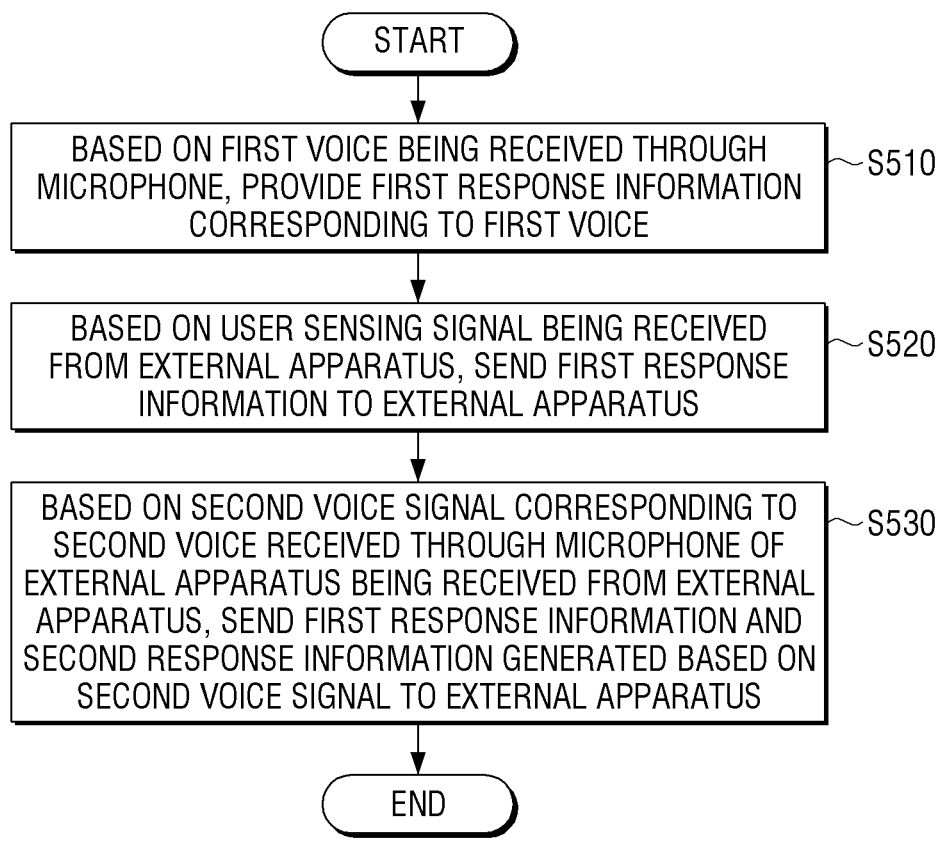

FIG. 7A
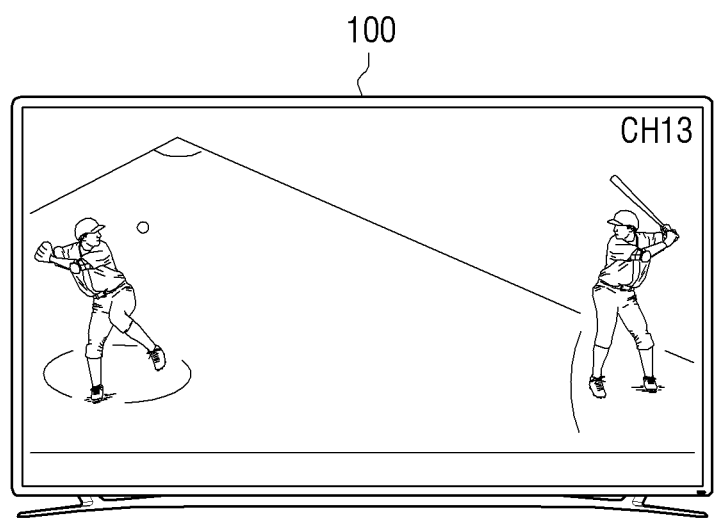
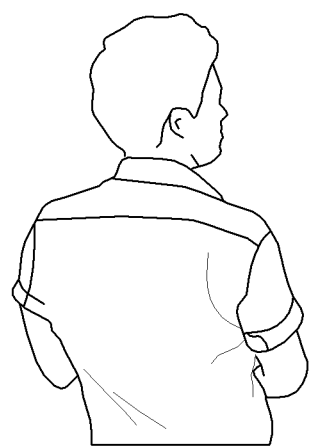

FIG. 7B
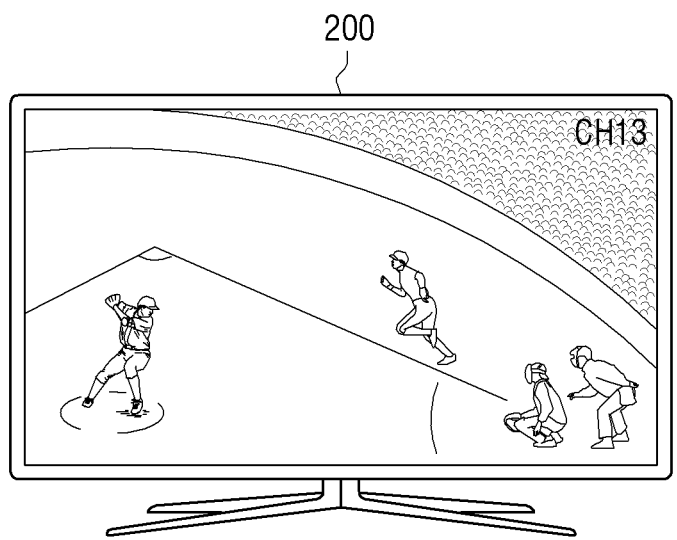
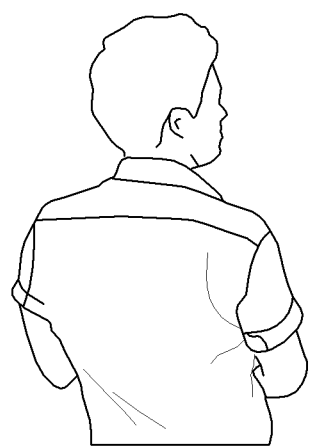

FIG. 8
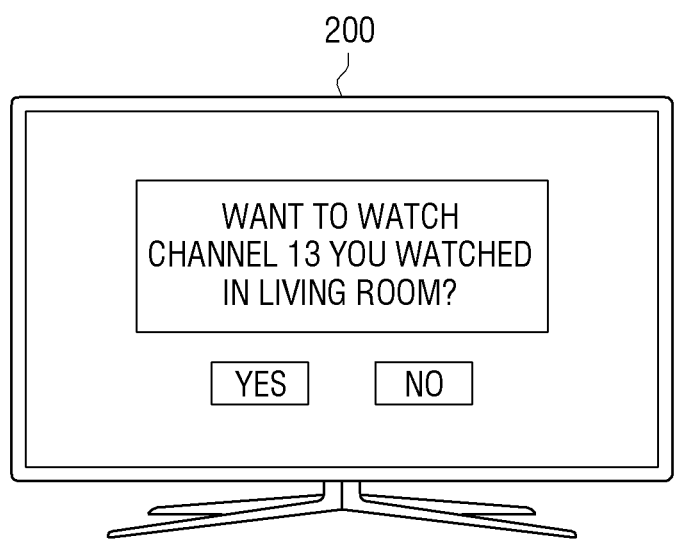
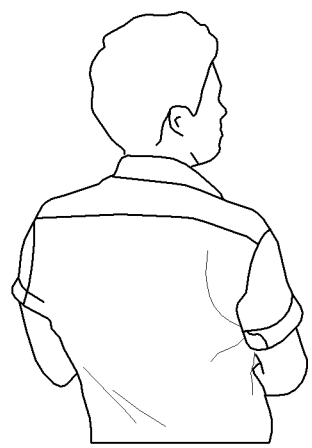

FIG. 11
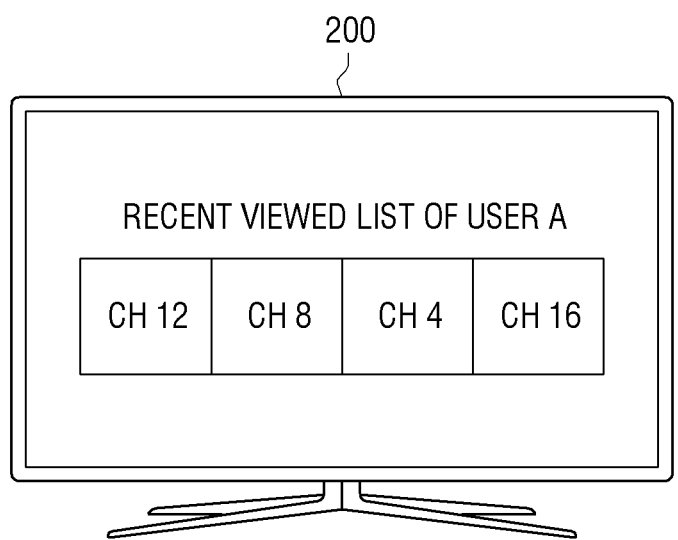
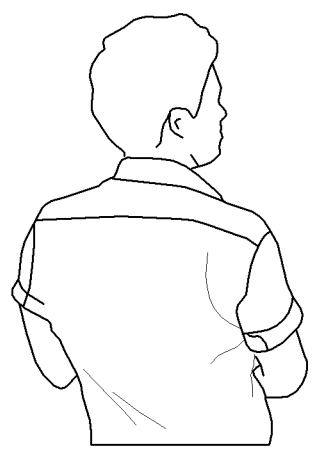

FIG. 12
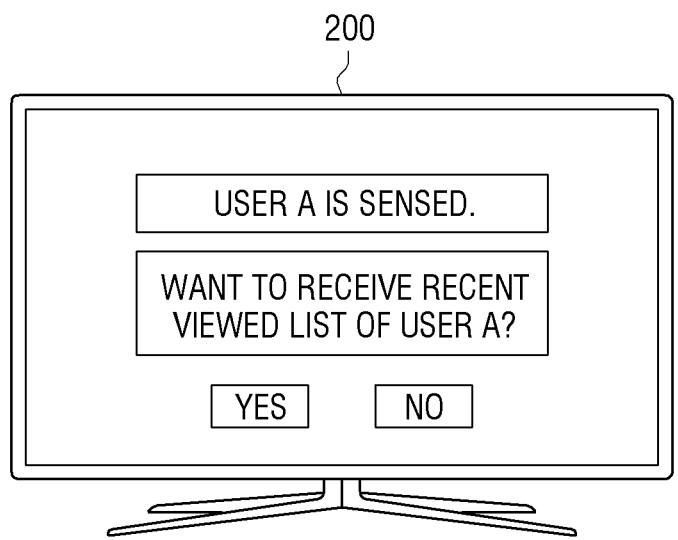
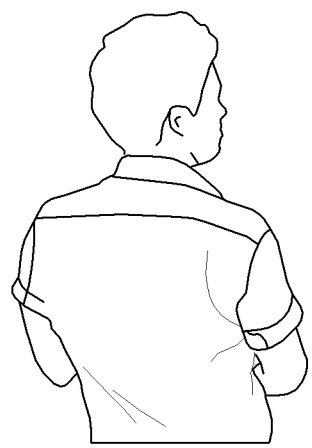

ELECTRONIC APPARATUS AND METHOD FOR CONTROLLING THEREOF

CROSS-REFERENCE TO RELATED APPLICATION

This application is based on and claims priority under 35 U.S.C. § 119 to Korean Patent Application No. 10-2017-0146934, filed in the Korean Intellectual Property Office on Nov. 6, 2017, and the disclosure of which is incorporated herein by reference in its entirety.

BACKGROUND

1. Field

Apparatuses and methods consistent with example embodiments relate to an electronic apparatus and a method for controlling thereof, and more particularly, to an electronic apparatus which is capable of transmitting and receiving various data and a method for controlling thereof.

2. Description of Related Art

With the advancement of electronic technology, various electronic apparatuses such as a TV, a computer, a notebook PC, and the like have been developed, and those electronic apparatuses provide various contents to satisfy specific needs of consumers. For example, display apparatuses such as a digital television (DTV) and the like may not only provide various broadcast programs in a high-quality screen but also be added with a data processing function and provide various broadcast services.

Meanwhile, a plurality of display apparatuses may be provided in a home. A user may watch broadcasting via a first display apparatus in Room 1 and may want to move to Room 2 and watch the same broadcasting via a second display apparatus in Room 2.

However, in order to watch the same broadcasting as the broadcasting watched via the first display apparatus via the second display apparatus in Room 2, the user of a related-art display apparatus has to additionally manipulate channels of the second display apparatus, which is inconvenient.

In addition, in the related-art display apparatus, when the user inputs voice to the first display apparatus, only a first display apparatus provides a result of voice recognition. Accordingly, the user has to input the same voice to the second display apparatus, which is inconvenient.

One or more example embodiments provide an electronic apparatus which is capable of, when a user desires to move to a new position and watch an image via a different display apparatus in the new position, continuously providing an image related to the image provided by the previous display apparatus, and a method for controlling thereof.

SUMMARY

According to an aspect of an example embodiment, there is provided an electronic apparatus comprising: a microphone configured to receive a user voice; a communication interface; and a processor configured, based on a first voice being received through the microphone, to provide first response information corresponding to the first voice, and based on a user sensing signal being received from an external apparatus through the communication interface, to control the communication interface to send the first response information to the external apparatus.

The electronic apparatus may further include a sensor. The processor may, based on a movement of the user moving outside a first area from the first area being sensed through the sensor and the user sensing signal being received from the external apparatus, send the first response information to the external apparatus. The first area may be a preset area from the electronic apparatus.

The electronic apparatus may further include a camera. The processor may, based on a movement of the user moving outside of a first area from the first area being sensed through an image captured through the camera and the user sensing signal being received from the external apparatus, send the first response information to the external apparatus. The first area may be a preset area from the electronic apparatus.

The processor may, based on the user sensing signal being received from a plurality of external apparatuses and based on the received user sensing signal, identify an external apparatus sensing the user for more than a preset time and send the first response information to the identified external apparatus.

The user sensing signal may be generated based on at least one of an image captured through a camera of the external apparatus, a voice received through a microphone of the external apparatus, and a movement of the user sensed through an infrared ray sensor of the external apparatus.

The processor may, based on a second voice signal corresponding to a second voice received through a microphone of the external apparatus being received from the external apparatus, send the first response information and second response information generated based on the second voice signal to the external apparatus.

The processor may send the first response information and the second voice signal to a server, receive the first response information and the second response information generated based on the second voice signal from the server, and send the received second response information to the external apparatus.

The processor may, based on the second voice signal being received through the communication interface within a preset time from when the first voice is received, send the second response information to the external apparatus, and based on the second voice signal being received through the communication interface after the preset time from when the first voice is received, send third response information corresponding to the second voice signal to the external apparatus.

The processor may, based on the second voice signal being received through the communication interface within a preset time from when the first voice is received, transmit the first response information and the second voice signal to a server, receive the first response information and the second response information generated based on the second voice signal from the server, and send the received second response information to the external apparatus, and based on the second voice signal being received through the communication interface after the preset time from when the first voice is received, send the second voice signal to the server, receive third response information corresponding to the second voice signal from the server, and send the received third response information to the external apparatus.

The processor may, based on a second voice signal corresponding to a second voice received through a microphone of the external apparatus being received from the external apparatus, compare a feature of the first voice with a feature of the second voice, and based on determining that users inputting the first voice and the second voice being a same person, send the first response information to the external apparatus.

The processor may identify the user based on a feature of the first voice and send viewing history information of the identified user to the external apparatus.

The processor may identify the user based on at least one of a broadcast channel number tuned in to by the electronic apparatus, a broadcast genre, and a channel zapping feature, and send viewing history information of the identified user to the external apparatus.

The processor may send, to the external apparatus, information about a content provided by the electronic apparatus. The information about the content may be at least one of information about a broadcast channel tuned in to by the electronic apparatus, information about an application being executed in the electronic apparatus, and information about a multimedia content being reproduced in the electronic apparatus.

The processor may perform communication with a user terminal and provides a content received from the user terminal, and based on a connection with the user terminal being released and a user terminal sensing signal being received from the external apparatus, send information related to the content to the external apparatus.

According to an aspect of an example embodiment, there is provided a method for controlling an electronic apparatus, the method comprising: receiving a first voice through a microphone; providing first response information corresponding to the first voice; and based on a user sensing signal being received from an external apparatus, sending the first response information to the external apparatus.

The sending may include, based on a movement of the user moving outside a first area from the first area being sensed through a sensor and the user sensing signal being received from the external apparatus, sending the first response information to the external apparatus. The first area may be a preset area from the electronic apparatus.

The sending may include, based on a movement of the user moving outside a first area from the first area being sensed through an image captured through a camera and the user sensing signal being received from the external apparatus, sending the first response information to the external apparatus. The first area may be a preset area from the electronic apparatus.

The sending may include, based on the user sensing signal being received from a plurality of external apparatuses, based on the received user sensing signal, identifying an external apparatus sensing the user for more than a preset time and sending the first response information to the identified external apparatus.

The user sensing signal may be generated based on at least one of an image captured through a camera of the external apparatus, a voice received through a microphone of the external apparatus, and a movement of the user sensed through an infrared ray sensor of the external apparatus.

The method may further include receiving, from the external apparatus, a second voice signal corresponding to a second voice received through a microphone of the external apparatus, and sending the first response information and second response information generated based on the second voice signal to the external apparatus.

The sending may include sending the first response information and the second voice signal to a server, receiving the first response information and the second response information generated based on the second voice signal from the server, and sending the received second response information to the external apparatus.

The sending may include, based on the second voice signal being received through the communication interface within a preset time from when the first voice is received, sending the second response information to the external apparatus, and based on the second voice signal being received through the communication interface after a preset time from when the first voice is received, sending third response information corresponding to the second voice signal to the external apparatus.

The sending the second response information to the external apparatus may include, based on the second voice signal being received through the communication interface within a preset time from when the first voice is received, transmit the first response information and the second voice signal to a server, receive the first response information and the second response information generated based on the second voice signal from the server, and send the received second response information to the external apparatus. The sending the third response information to the external apparatus may include, based on the second voice signal being received through the communication interface after a preset time from when the first voice is received, sending the second voice signal to the server, receiving third response information corresponding to the second voice signal from the server, and sending the received third response information to the external apparatus.

The sending may include, based on a second voice signal corresponding to a second voice received through a microphone of the external apparatus being received from the external apparatus, comparing a feature of the first voice with a feature of the second voice, and based on determining that users inputting the first voice and the second voice being a same person, sending the first response information to the external apparatus.

The method may further include identifying the user based on a feature of the first voice and sending viewing history information of the identified user to the external apparatus.

The method may further include identifying the user based on at least one of a broadcast channel number tuned in to by the electronic apparatus, a broadcast genre, and a channel zapping feature, and sending viewing history information of the identified user to the external apparatus.

The method may further include sending, to the external apparatus, information about a content provided by the electronic apparatus. The information about the content may be at least one of information about a broadcast channel tuned in to by the electronic apparatus, information about an application being executed in the electronic apparatus, and information about a multimedia content being reproduced in the electronic apparatus.

The method may further include performing communication with a user terminal and providing a content received from the user terminal, and based on a connection with the user terminal being released and a user terminal sensing signal being received from the external apparatus, sending information related to the content to the external apparatus.

According to the various example embodiments described above, the user can continuously watch an image related to an image provided via an electronic apparatus via an external apparatus located at a different position from the electronic apparatus.

BRIEF DESCRIPTION OF THE DRAWINGS

The above and/or other aspects will become more apparent by reference to example embodiments which are illustrated in the appended drawings. Understanding that these drawings depict only example embodiments and are not therefore to be considered to be limiting of the scope of the disclosure, the principles herein are described and explained with additional specificity and detail via the use of the accompanying drawings, in which:

FIGS. 4A and 4B illustrate an example embodiment of an operation of an electronic apparatus in a case where a user utters a voice and moves from a position to another position;

FIG. 5 is a flowchart of an operation of an electronic apparatus in a case where a user moves from a position to another position and utters a new voice;

FIGS. 7A and 7B illustrate an example embodiment of an operation of an electronic apparatus in a case where a user watching an image moves from a position to another position;

FIG. 8 illustrates another example embodiment of an operation of an electronic apparatus in a case where a user watching an image moves from a position to another position;

FIG. 11 illustrates an example embodiment of an operation of an electronic apparatus providing viewing history information;

FIG. 12 illustrates another example embodiment of an operation of an electronic apparatus providing viewing history information.

DETAILED DESCRIPTION

The terms used in the present disclosure and the claims are general terms selected in consideration of the functions of the various example embodiments of the present disclosure. However, these terms may vary depending on intention, legal or technical interpretation, emergence of new technologies, and the like of those skilled in the related art. Also, there may be some terms arbitrarily selected by an applicant. Unless there is a specific definition of a term, the term may be construed based on the overall contents and technological common sense of those skilled in the related art.

In describing example embodiments, detailed description of relevant known functions or components may be omitted if it would obscure the description of the subject matter.

Further, example embodiments of the present disclosure are described below in detail with reference to the accompanying drawings and the descriptions stated in the accompanying drawings, but the present disclosure is not limited by the example embodiments.

Hereinafter, the display apparatus according to an example embodiment will be described in greater detail with reference to the accompanying drawings.

Figure 1:
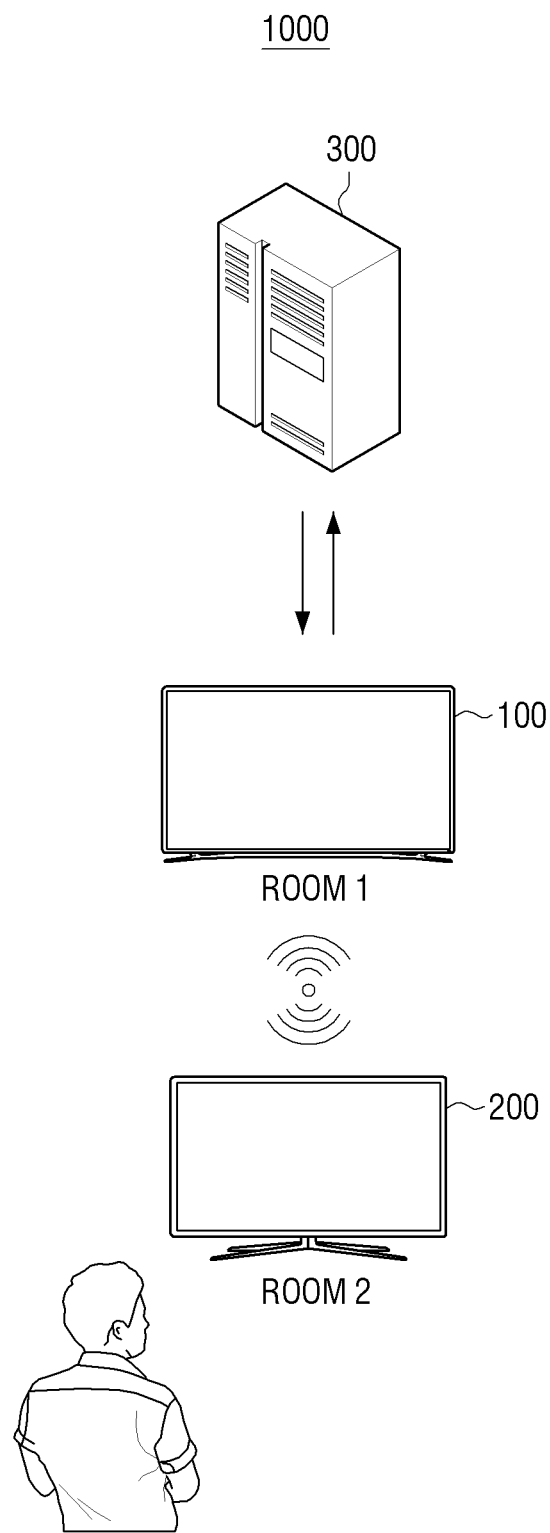
FIG. 1 is a diagram illustrating an electronic system according to an example embodiment.

FIG. 1 is a diagram illustrating an electronic system 1000, according to an example embodiment.

Referring to FIG. 1, the electronic system 1000 according to an example embodiment of the present general inventive concept includes an electronic apparatus 100, an external apparatus 200, and a server 300.

The electronic apparatus 100 is an internet-enabled apparatus, and the electronic apparatus 100 may be implemented as a smart TV located in Room 1 as illustrated in FIG. 1. However, this is only an example, and the electronic apparatus 100 may be implemented as various electronic apparatuses such as a set-top box, a smartphone, a desktop PC, a notebook PC, and the like.

The electronic apparatus 100 may communicate with the external apparatus 200 and transmit and receive various data. For example, the electronic apparatus 100 may communicate with the external apparatus 200 and transmit, to the external apparatus 200, information that relates to an image being provided by the electronic apparatus 100.

The information relating to the image being provided by the electronic apparatus 100 may not only be information that relates to a broadcast image being provided by the electronic apparatus 100 but also be various information such as information relating to a multimedia content image, information relating to an application image, and the like.

In addition, when the user utters a voice to the electronic apparatus 100, the information relating to the image being provided may be information relating to the voice recognition result.

Accordingly, when the user turns on the external apparatus 200, unlike a related-art display apparatus providing an image which is displayed right before the turn-off, the external apparatus 200 according to an example embodiment may provide an image which was being provided by the electronic apparatus 100.

Accordingly, the user may be continuously provided with an image which was being provided by the electronic apparatus 100 without the need to input an additional user command.

The external apparatus 200 executing this function may be implemented as a smart TV located in Room 2 as illustrated in FIG. 1. However, this is only an example, and the external apparatus 200 may be implemented as various electronic apparatuses such as a smartphone, a desktop PC, a notebook PC, and the like.

Meanwhile, one external apparatus is present in FIG. 1, but the number of external apparatuses is not limited thereto. That is, two or more external apparatuses may be present.

The electronic apparatus 100 may communicate with the server 300 and transmit and receive various data. For example, when a user's voice is received via a microphone of the electronic apparatus 100, the electronic apparatus 100 may transmit a voice signal corresponding to the received voice to the server 300.

In addition, the electronic apparatus 100 may receive, from the server 300, a voice recognition result (hereinafter referred to as "response information") corresponding to the voice signal.

Meanwhile, the electronic apparatus 100 may transmit response information received from the server 300 to the external apparatus 200. Accordingly, the user may be provided with response information which was being provided by the electronic apparatus 100 without the need to input the same voice as the voice input to the electronic apparatus again to the external apparatus 200.

One or more exemplary embodiments will be described in detail with reference to the accompanying drawings.

Figure 2:
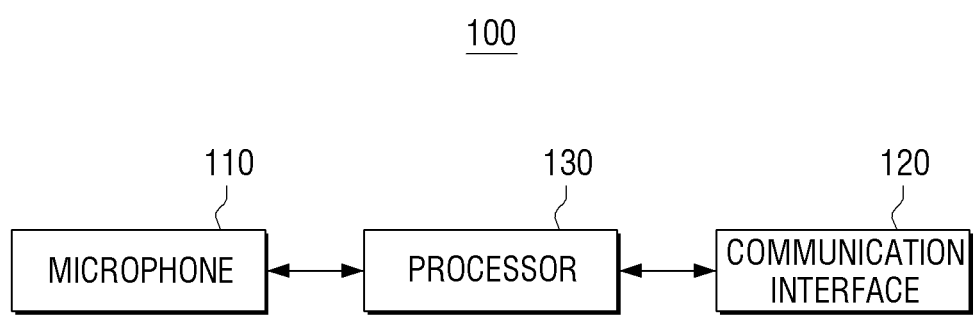
FIG. 2 is a block diagram of an electronic apparatus, according to an example embodiment.

FIG. 2 is a block diagram of an electronic apparatus, according to an example embodiment.

Referring to FIG. 2, the display apparatus 100 according to an example embodiment includes a microphone 110, a communication interface 120, and a processor 130.

The microphone 110 may receive a user voice. The user voice may be not only a voice uttered by a user to execute a particular function but also a voice uttered by a user in everyday conversation.

The communication interface 120 may communicate with various types of external apparatuses according to various manners of communication.

The communication interface 120 may include various circuitry to receive a broadcast content (or a broadcast signal). The broadcast content may include images, audio, and additional data (for example, an EPG). The communication interface 130 may receive the broadcasting content from various sources such as terrestrial broadcasting, cable broadcasting, satellite broadcasting, Internet broadcasting, etc.

To this end, the communication interface 120 may be implemented to include a tuner (not shown), a demodulator (not shown), and an equalizer (not shown).

The communication interface 120 may communicate with the external apparatus 200 and perform transmission and reception with the external apparatus 200. For example, the communication interface 120 may communicate with the external apparatus 200 and transmit, to the external apparatus 200, information that relates to an image being provided by the electronic apparatus 100.

The information relating to the image being provided by the electronic apparatus 100 may be not only information that relates to a broadcast image being provided by the electronic apparatus 100 but also various information such as information relating to a multimedia content image, information relating to an application image, and the like.

In addition, when the user inputs a voice to the microphone 110, the information relating to an image being provided by the electronic apparatus 100 may be response information relating to the input voice.

For this operation, the communication interface 120 may include a Wi-Fi chip, a Bluetooth chip, or the like.

The communication interface 120 may communicate with the server 300 and perform transmission and reception of various data. For example, when a user voice is received via the microphone 110, the communication interface 120 may transmit a voice signal corresponding to the received user voice to the server 300.

In addition, the communication interface 120 may receive, from the server 300, response information corresponding to the voice signal.

For that purpose, the communication interface 120 may further include a wireless communication chip.

The processor 130 controls an overall operation of the electronic apparatus 100. To this end, the processor 130 may include one or more of a central processing unit (CPU), application processor (AP) and communication processor (CP).

The operations of the processor 130 are described in greater detail below with reference to the accompanying drawings.

Figure 3:
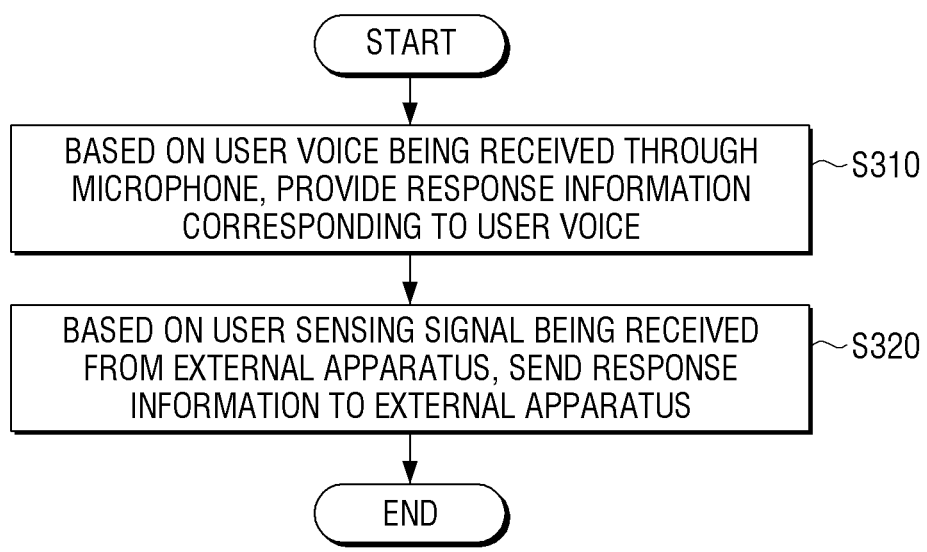
FIG. 3 is a flowchart of an operation of an electronic apparatus in a case where a user utters a voice and moves from a position to another position.

FIG. 3 is a flowchart of an operation of an electronic apparatus in a case where a user utters a voice and moves from a position to another position.

When a user voice is received via the microphone 110, the processor 130 may provide response information corresponding to the user voice at operation S310.

In detail, when a user voice is received via the microphone 110, the processor 130 may convert the user voice, which is an analog signal, to a digital signal (hereinafter referred to as "voice signal") and transmit it to the server 300. To this end, the processor 130 may utilize an analog/digital converter (not shown).

In addition, when a voice signal is received from the electronic apparatus 100, the server 300 may convert the received voice signal to a text. For example, when a voice signal is received, the server 300 may convert the voice signal to a text via a speech-to-text (STT) algorithm.

In addition, the server 300 may acquire an utterance element from the text. The utterance element is a keyword for carrying out an operation requested by a user in the user voice. For example, when a voice signal corresponding to a user voice such as "How is the weather in Seoul tomorrow?" is received from the electronic apparatus 100, the server 300 may convert the voice signal to a text and then acquire utterance elements "tomorrow", "Seoul", "weather" and "How is?" from the converted text.

The server 300 may search for weather information based on the acquired utterance elements and transmit response information including information relating to the search result to the electronic apparatus 200.

Accordingly, the processor 130 may provide information relating to tomorrow's weather in Seoul, that is, response information corresponding to a user voice, based on the response information received from the server 300.

Thereafter, when a user sensing signal is received from the external apparatus 200 via the communication interface 120, the processor 130 may transmit response information received from the server 300 to the external apparatus 200.

In detail, when a motion that a user uttering a voice in a first area moves outside the first area is sensed and a user sensing signal is received from the external apparatus 200, the processor 130 may transmit response information received from the server 300 to the external apparatus 200. That is, when the user utters a voice and moves from a position to another position, the processor 130 may transmit the response information received from the server 300 to the external apparatus 200.

The first area may be an area preset by the electronic apparatus 100. For example, the first area may be an inner area of virtual lines created at ±45° based on a virtual line in front of the electronic apparatus 100.

However, this is only an example, and the first area may be an area in which the user is sensed by a sensor provided in the electronic apparatus 100 such as an infrared ray sensor and the like. When the user is not sensed by the sensor, the processor 130 may determine that the user has moved outside the preset area.

To this end, the processor 130 may sense a motion of the user uttering a voice via a sensor (not shown). The sensor (not shown) may be implemented not only as an infrared ray sensor as described above, but also as various sensors capable of sensing a motion of the user in front of the electronic apparatus 100.

The processor 130 may sense a user moving outside the first area based on infrared ray information sensed through the infrared ray sensor, or may sense a user moving outside the first area based on an illumination value change sensed through an illumination sensor or a color value change sensed through a color sensor.

In addition, when a motion that a user uttering a voice in a first area moves outside the first area is sensed from an image captured via a camera (not shown) and a user sensing signal is received from the external apparatus 200, the processor 130 may transmit response information received from the server 300 to the external apparatus 200.

As described above, the first area may be not only an inner area of virtual lines created at ±45° based on a virtual line in front of the electronic apparatus 100 but also an area included in an image captured via the camera.

Meanwhile, the user sensing signal may be a signal generated by the external apparatus 200.

In detail, when a user is sensed in an image captured via a camera of the external apparatus 200, a user voice is received via a microphone of the external apparatus 200, or a user motion is sensed via a sensor of the external apparatus 200, the external apparatus 200 may generate a user sensing signal including information indicating that the user has been sensed. The sensor of the external apparatus 200 may be implemented as various sensors which are capable of sensing a user motion in front of the external apparatus 200 such as an infrared ray sensor, an illumination sensor, a color sensor, and the like.

It is described herein that when a user sensing signal is received from the external apparatus 200, the processor 130 transmits response information received from the server 300 to the external apparatus 200. However, the processor 130 may share the response information received from the server 300 with the external apparatus 200 before the user sensing signal is received from the external apparatus 200.

That is, the processor 130 may share response information received from the server 300 with the external apparatus 200 before a user motion to move outside the first area is sensed. When a user is sensed, the external apparatus 200 may provide the response information being shared without additionally transmitting a user sensing signal to the electronic apparatus 100.

Meanwhile, according to circumstances, the processor 130 may receive a user sensing signal from a plurality of external apparatuses. For example, while first and second external apparatuses are present in the same room, when the user passes a preset area of the first external apparatus and moves to a preset area of the second external apparatus, or while the first external apparatus is present in Room 1 and the second external apparatus is present in Room 2, when the user passes a preset area of the first external apparatus in Room 1 and moves to a preset area of the second external apparatus in Room 2, the processor 130 may receive a user sensing signal from each of the first and second external apparatuses.

The processor 130 may identify an external apparatus sensing a user for over a preset time based on the user sensing signals received from the first and second external apparatuses. In detail, the processor 130 may, through the user sensing information included in the user sensing signal, determine a time for which each of the first and second external apparatuses senses the user, and identify an external apparatus that senses the user for over a predetermined time.

For example, when information that the user has been sensed for two seconds is included in the user sensing information included in the user sensing signal received from the first external apparatus, information that the user has been sensed for four seconds is included in the user sensing information included in the user sensing signal received from the second external apparatus, and a preset time is three seconds, the processor 130 may identify the second external apparatus that has sensed the user for more than three seconds. In addition, the processor 130 may transmit response information received from the server 300 to the second external apparatus.

Meanwhile, in addition to the case described above, the processor 130 may transmit response information to the external apparatus 200 in various cases.

For example, when the electronic apparatus 100 is turned off and the external apparatus 200 is turned on within a predetermined time, the processor 130 may transmit response information received from the server 300 to the external apparatus 200. For this purpose, the processor 130 may receive status information of the external apparatus 200 from the external apparatus. The status information may include information that relates to power on/off of the external apparatus.

In addition, when a user terminal connected to the electronic apparatus 100 via a network such as Bluetooth, Wi-Fi and the like releases network connection with the electronic apparatus 100 and performs network connection with the external apparatus 200, the processor 130 may transmit response information received from the server 300 to the external apparatus 200. For this purpose, the processor 130 may receive a user terminal sensing signal from the external apparatus 200. The user terminal sensing signal may include information that the user terminal is communicatively connected to the external apparatus 200.

In the various cases described above, the processor 130 may transmit response information received from the server 300 to the external apparatus 200.

Accordingly, the external apparatus 200 may provide response information received from the electronic apparatus 100. In addition, the user can be provided with response information being provided by the electronic apparatus 100 through the external apparatus 200 without the need to utter the same voice to the external apparatus 200 again, thereby enhancing the user convenience.

Meanwhile, it is described in the above example embodiment that the electronic apparatus 100 receives response information from the server 300. However, the response information relating to the user voice may be generated by the electronic apparatus 100 itself.

For example, when a user voice such as "How is the weather in Seoul today?" is received via the microphone 110, the processor 130 may convert the received voice to a text, acquire an utterance element from the converted text and then searches for weather information based on the acquired utterance element.

In addition, as in the case described above, when a user sensing signal is received from the external apparatus 200, the processor 130 may transmit the generated response information to the external apparatus 200.

Figure 4A:
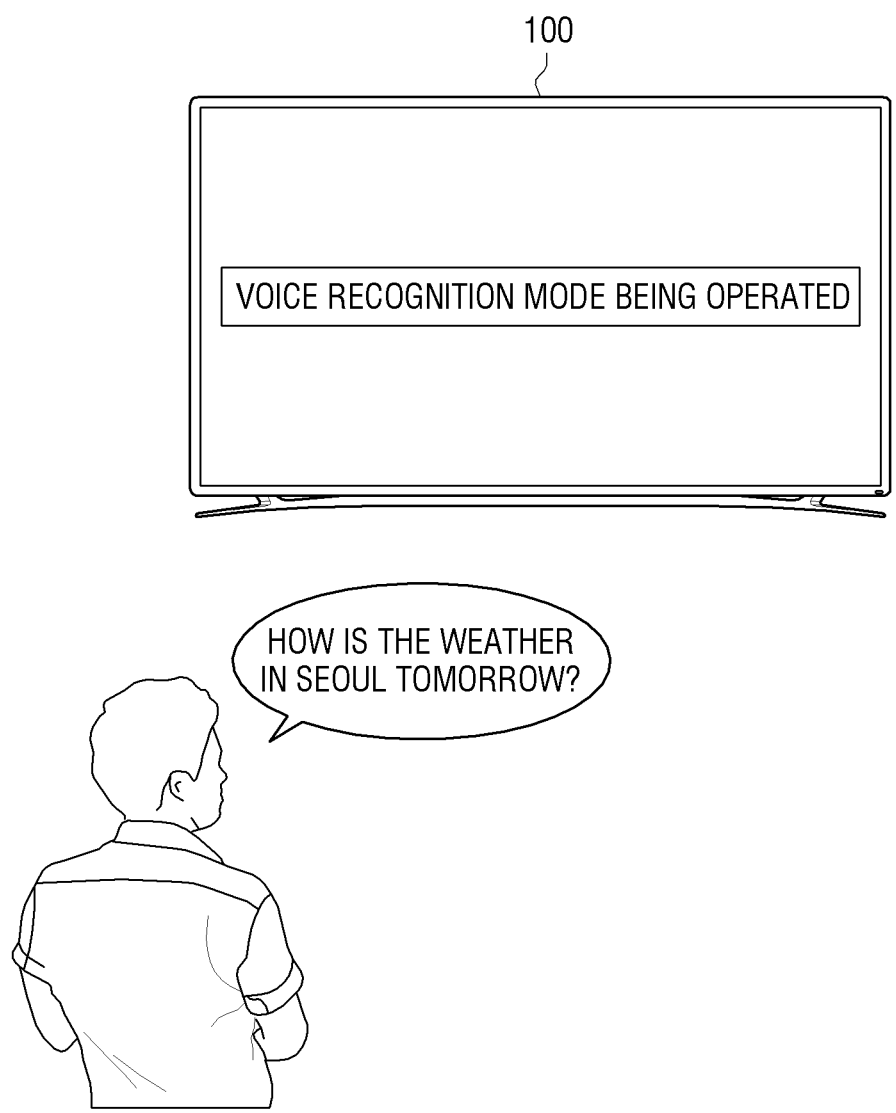

FIGS. 4A and 4B illustrate an example embodiment of an operation of an electronic apparatus in a case where the user utters a voice and moves from a position to another position.

The user may activate a voice recognition mode of the electronic apparatus 100. For example, the user may activate the voice recognition mode of the electronic apparatus 100 by uttering a trigger voice such as "Hi, TV".

In addition, as illustrated in FIG. 4A, in a state in which the voice recognition mode of the electronic apparatus 100 is activated, the user may utter a voice such as "How is the weather in Seoul tomorrow?". The processor may provide weather information found via the Internet or weather information received via communication with the server 300 as response information.

In addition, when a user sensing signal is received from the external apparatus 200, the processor 130 may send the response information to the external apparatus 200.

In detail, when a motion of the user to move outside a first area from the first area and a user sensing signal is received from the external apparatus 200, the processor 130 may send the response information to the external apparatus 200.

The user's motion may not only be sensed by a sensor such as an infrared ray sensor and the like provided in the electronic apparatus 100 as mentioned above, but also may be sensed from an image captured by a camera.

Accordingly, as illustrated in FIG. 4B, the external apparatus 200 may provide response information received from the electronic apparatus 100.

Meanwhile, the information that the processor 130 sends to the external apparatus 200 is not limited to response information regarding a voice input to the microphone 110.

For example, the processor 130 may also send information about a content being provided in the electronic apparatus 100 to the external apparatus 200. For example, the information about the content may include at least one of information about a broadcast channel tuned in the electronic apparatus 100, information about an application being executed in the electronic apparatus 100, and information about a multimedia content being reproduced in the electronic apparatus.

The information about the broadcast channel tuned in the electronic apparatus 100 may include information about a channel of broadcasting being watched by the user via the electronic apparatus 100. The application information may include information about a list of applications being executed by the user through the electronic apparatus 100. In addition, the multimedia content information may be a content of various types such as a photo content, video content and the like which is executed by the user through the electronic apparatus 100.

Meanwhile, this content information is only an example, and the content of various types provided by the electronic apparatus 100 may be included in the information about the content of the present disclosure.

In addition, the information about the content may be a content received from a user terminal (for example, a smartphone, a tablet PC, and the like) network-connected to the electronic apparatus 100.

In addition, when a motion of the user to move outside a first area from the first area and a user sensing signal is received from the external apparatus 200, the processor 130 may control the communication interface 120 to send the information about the content to the external apparatus 200.

In addition, the processor 130 may communicate with the user terminal, and in a state that a content received from the user terminal is being provided, when a communicative connection with the user terminal is released and a user terminal sensing signal is received from the external apparatus 200, the processor 130 may send information related to a content provided by the user terminal to the external apparatus 200.

The user terminal sensing signal may be generated when the user terminal is communicatively connected to the external apparatus 200. In detail, the user terminal sensing signal may include information that the user terminal has been network-connected to the external apparatus 200.

Accordingly, the external apparatus 200 may continuously provide a content being provided by the electronic apparatus 100 through the external apparatus 200 based on the content information received from the electronic apparatus 100. The user may be continuously provided with an image of the same channel as a channel watched in the electronic apparatus 100 via the external apparatus 200. In addition, the user can be provided with a list of previously-run applications and multimedia contents, and thereby an application or multimedia content to be executed can be easily selected.

FIG. 5 is a flowchart of an operation of an electronic apparatus in a case where the user moves from a position to another position and utters a new voice.

When a first voice is received via a microphone, the electronic apparatus 100 may provide first response information corresponding to the first voice at operation S510. In addition, when a user sensing signal is received from the external apparatus 200, the electronic apparatus 10 may send the first response information to the external apparatus at operation S520.

Thereafter, when a second voice signal corresponding to a second voice received via the microphone of the external apparatus 200 is received from the external apparatus 200, the electronic apparatus 100 may send the first response information and second response information generated based on the second voice signal to the external apparatus 200 at operation S530.

In detail, when a second voice is received via a microphone of the external apparatus 200, the external apparatus 200 may convert the second voice, which is an analog signal, to a digital signal (hereinafter referred to as "second voice signal") and transmit the second voice signal to the electronic apparatus 100.

In addition, when the second voice signal is received from the external apparatus 200 via the communication interface 120, the processor 130 may control the communication interface 120 to send the first response information and the second response information generated based on the second voice signal to the external apparatus 200.

To this end, the processor 130 may store the first response information received from the server 300 in a storage (not shown).

For example, when the user inputs a first voice "How is the weather in Seoul tomorrow?" to the microphone 110 of the electronic apparatus 100 and the processor 130 receives response information for the first voice from the server 300, the processor 130 may store response information for "How is the weather in Seoul tomorrow?" in the storage.

Thereafter, when the user inputs a second voice "How about Suwon?" to a microphone of the external apparatus 200, the processor 130 may receive a second voice signal corresponding to the second voice from the external apparatus 200.

In addition, the processor 130 may send the second voice signal received from the external apparatus 300 and the first response information stored in the storage to the server 300.

The server 300 may generate second response information based on the second voice signal and the first response information stored in the storage.

First, the server 300 may acquire an utterance element from the second voice signal. In the example embodiment described above, the server 300 may convert the second voice signal into a text and acquire an utterance element of "Suwon".

In addition, the server 300 may generate second response information in consideration of the first response information received from the electronic apparatus 100 together with the second voice signal. In the example embodiment described above, the server 300 may generate "Tomorrow's weather information in Suwon" as second response information in consideration of "Tomorrow's weather information in Seoul" which is first response information for "How is the weather in Seoul tomorrow?", together with "Suwon" which is an utterance element acquired from the second voice signal.

Thereafter, when the second response information is received from the server 300 via the communication interface 120, the processor 130 may control the communication interface 120 to send the second response information to the external apparatus 200.

Meanwhile, in a case where a second voice signal is received via the communication interface 120 within a preset time from when the first voice is received via the microphone 100, the processor 130 may send the second response information to the external apparatus 200 as described above. In a case where the second voice signal is received via the communication interface 120 after the preset time from when the first voice is received via the microphone 100, the processor 130 may send third response information corresponding to the second voice signal to the external apparatus 200.

That is, only when the second voice signal is received from the external apparatus 200 within the preset time from when the first voice signal is received, the processor 130 may send the first response information and the second response information based on the second voice signal to the external apparatus 300.

The reason is that in a case where a preset time has elapsed, it is common that the user desires to receive only response information for the second voice signal which is irrelevant to the first response information.

In addition, in a case where the preset time has elapsed, the processor 130 may delete the first response information stored in the storage. That is, the processor 130 may temporarily store the first response information only for the preset time, and when the preset time has elapsed, delete the temporarily-stored first response information, thereby preventing performance deterioration of the electronic apparatus 100 and efficiently using a limited internal storage.

Meanwhile, in the example embodiment described above, the server 300 generates second response information based on the first response information and the second voice signal. However, the operation may be carried out by the electronic apparatus 100 as well.

In detail, when a second voice signal is received from the external apparatus 200, the processor 130 may convert the second voice signal to a text and acquire an utterance element and then determine whether the processor 130 is capable of carrying out an operation corresponding to the second voice signal on its own. For example, in a case where the first response information is "content information for each episode of a particular broadcast program" and the second voice is "select the first one", the processor 130 may send information about a content of the first episode of the particular broadcast program to the external apparatus 300.

As described above, the processor 130 can send the first response information and the second response information generated based on the second voice signal to the external apparatus 300, and thereby the user can obtain desired information more conveniently.

Figure 6A:
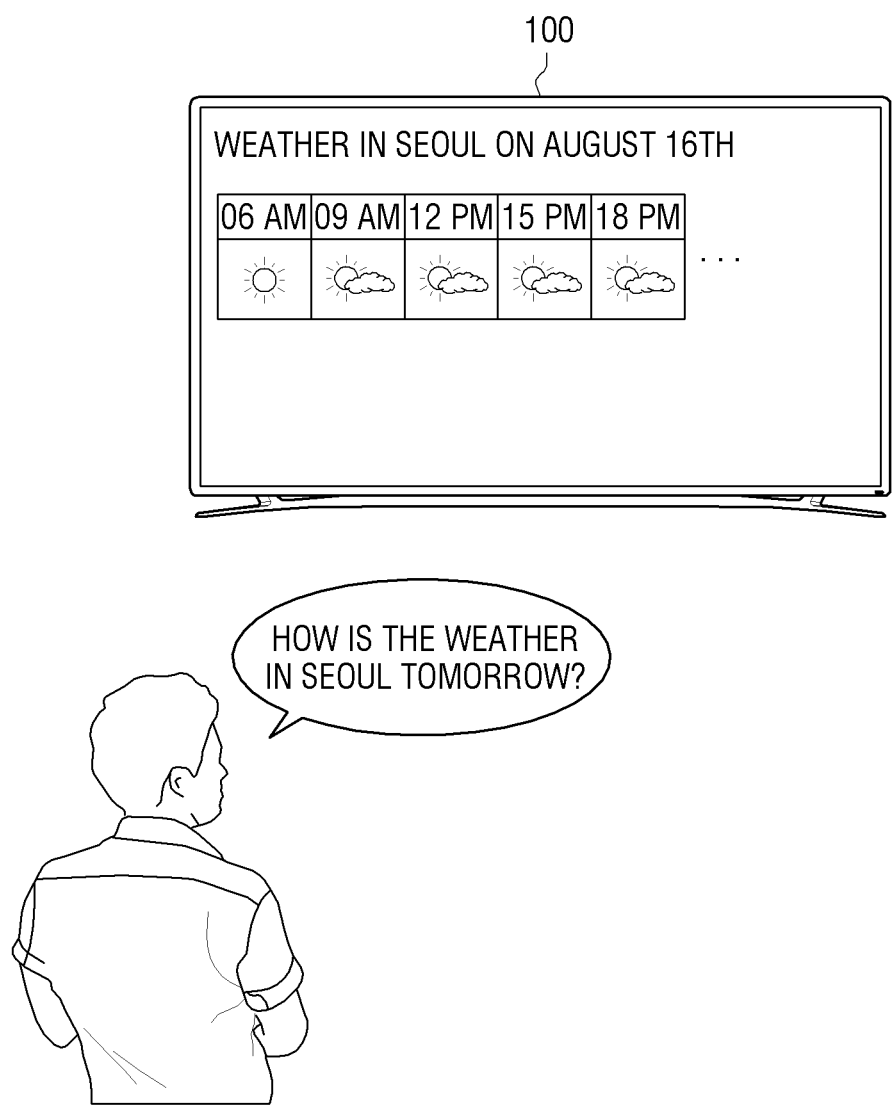
FIGS. 6A and 6B illustrate an example embodiment of an operation of an electronic apparatus in a case where a user moves from a position to another position and then utters a new voice.
Figure 6B:
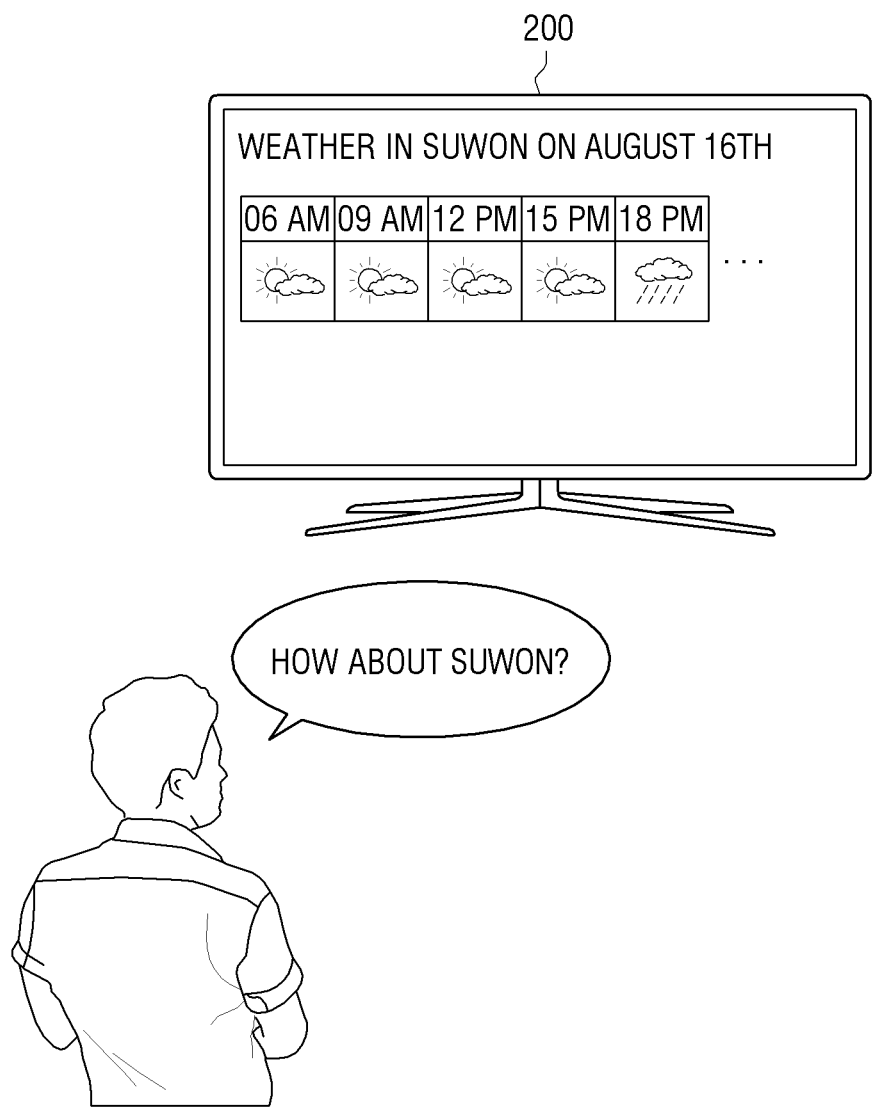

FIGS. 6A and 6B illustrate an example embodiment for explaining an operation of an electronic apparatus in a case where a user having moved from a position to another position utters new voice after movement.

As illustrated in FIG. 6A, in a state that the electronic apparatus 100 has activated a voice recognition mode, when the user utters a first voice such as "How is the weather in Seoul tomorrow?", the processor 130 may send a first voice signal corresponding to the first voice to the server 300.

In addition, the server 300 may acquire an utterance element from the first voice signal, search for information about tomorrow's weather in Seoul, and then send the information to the electronic apparatus 110. The processor 130 may search for information about tomorrow's weather in Seoul via the Internet on its own and provide the information.

Accordingly, as illustrated in FIG. 6A, when the electronic apparatus 100 is implemented as a TV, the electronic apparatus 100 may display information about tomorrow's weather in Seoul.

Thereafter, when the user moves into a preset area of the external apparatus 200 and utters a second voice, the processor 130 may receive a second voice signal corresponding to the second voice from the external apparatus 200.

In addition, the processor 130 may send the first response information and second response information generated based on the second voice signal to the external apparatus 200.

For example, as illustrated in FIG. 6B, when the user utters a second voice such as "How about Suwon?", the processor 130 may receive a second voice signal for "How about Suwon?" from the external apparatus 200.

In addition, the processor 130 may send "Tomorrow's weather information in Seoul" which is first voice information and a second voice signal corresponding to the second voice of "How about Suwon?" to the server 300, receive second response information of "Information about tomorrow's weather in Suwon" from the server 300, and send the received second response information to the external apparatus 200.

As described above, the processor 130 may search for information relating to tomorrow's weather in Suwon on its own and then send the found information to the external apparatus 200.

FIGS. 7A and 7B are an example embodiment of an operation of an electronic apparatus in a case where a user watching an image moves from a position to another position.

When the user moves close to the external apparatus 200 while the electronic apparatus 200 outputs a content, the processor 130 may send information about the content to the external apparatus 200.

That is, while the content is output, when a user's movement to move outside a predetermined area of the electronic apparatus 100 is sensed and a user sensing signal is received from the external apparatus 200, the processor 130 may send information about the content to the external apparatus 200.

The information about the content may include at least one of information related to a channel of broadcasting tuned in the electronic apparatus 100, information related to an application being executed in the electronic apparatus 100, and information related to a multimedia content being reproduced in the electronic apparatus 100.

Referring to FIG. 7A, the user is watching a baseball game on channel 13 through the electronic apparatus 100.

In addition, when the user moves close to the external apparatus 200, the processor 130 may send content information for channel 13 to the external apparatus 200. Accordingly, when a turn-on command is input, the external apparatus 200 may automatically convert a channel to channel 13 and output an image.

For example, referring to FIG. 7B, when a turn-on command is input, the external apparatus 200 may automatically change the channel to channel 13 and output an image.

Accordingly, the user may additionally manipulate channels of the external apparatus 200 and continuously watch a previously-watched broadcasting without tuning in to the previously-watched broadcasting, thereby enhancing the user convenience.

FIG. 8 is another example embodiment of an operation of an electronic apparatus in a case where a user watching an image moves from a position to another position.

Referring to FIG. 8, when the user watches a baseball game on channel 13 through the electronic apparatus 100 and moves to an area of the external apparatus 200, the processor 200 may send, to the external apparatus 200, a signal requesting to display a UI demanding a user selection regarding whether the user is going to continuously watch a broadcasting of the same channel.

When the user selects a YES UI, the external apparatus 200 may change the channel to channel 13 and output an image. When the user selects a NO UI, the external apparatus 200 may output an image which had been provided right before the external apparatus 200 was turned off.

Figure 9:
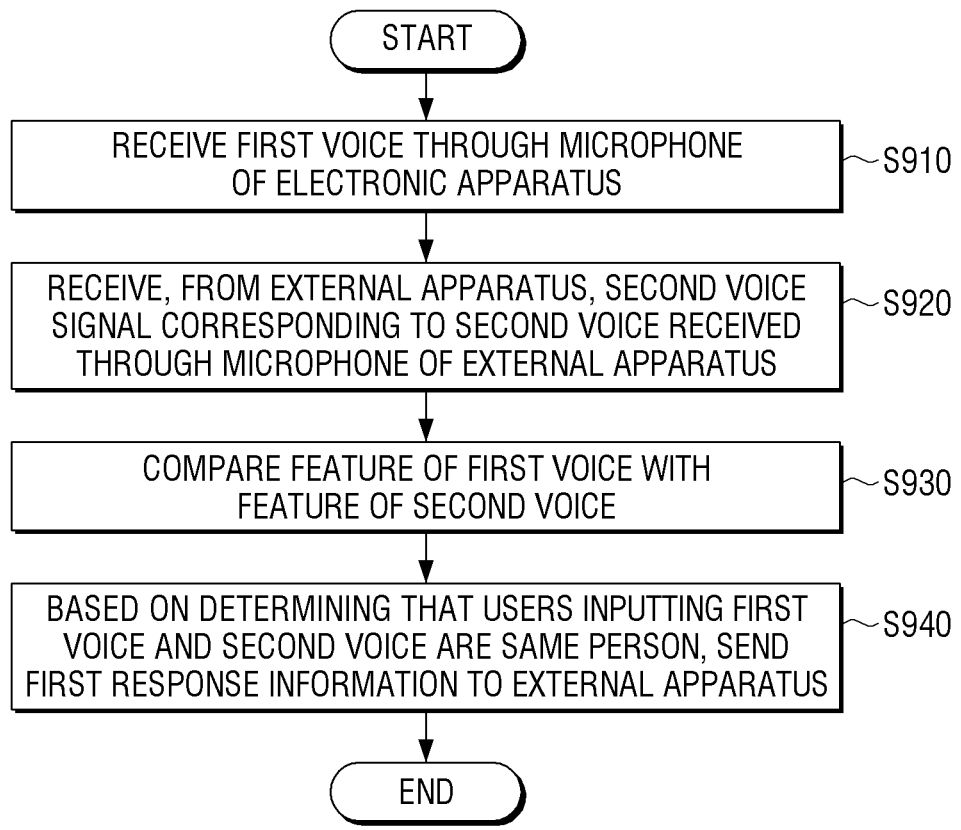
FIG. 9 is a flowchart of an operation of an electronic apparatus in a case where an identified user moves from a position to another position.

FIG. 9 is a flowchart of an operation of an electronic apparatus in a case where a user is identified and the identified user moves from a position to another position.

The processor 130 may receive a first voice via the microphone 110 at operation S910. In addition, when a second voice signal corresponding to a second voice received via a microphone of the external apparatus 200 is received from the external apparatus 200 at operation S920, the processor 130 may compare a feature of the first voice with a feature of the second voice at operation S930.

In detail, when the first voice is received, the processor 130 may analyze the feature of the first voice based on the energy, frequency bandwidth and voice-to-noise ratio of the first voice.

In addition, when the second voice signal is received, the processor 130 may convert the second voice signal to an analog signal via a digital/analog converter (not shown), and analyze a feature of the second voice based on the energy, frequency bandwidth and voice-to-noise ratio of the converted analog signal.

Thereafter, the processor 130 may compare features of the first voice and the second voice, and when it is determined that users who inputted the first and second voices are the same person, send first response information to the external apparatus 200 at operation S940.

In detail, the processor 130 may compare features of the first and second voices, and when the degree of matching is more than a preset threshold, determine that the users inputting the first and second voices are the same person.

Accordingly, the electronic apparatus 100 according to an example embodiment may, only when the same user moves, provide the first response information to the external apparatus 200, thereby providing information that corresponds to the user's needs.

Figure 10:
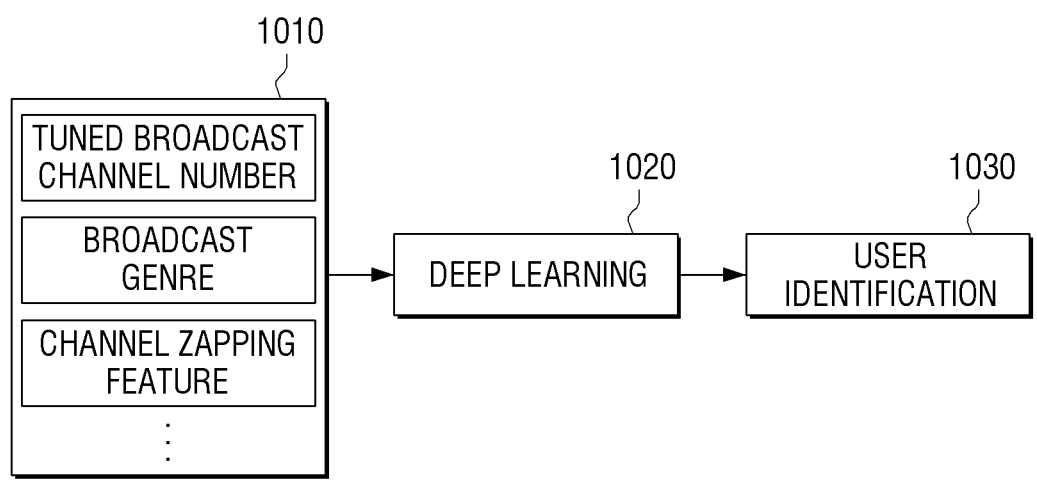
FIG. 10 is a diagram illustrating an operation of an electronic apparatus of identifying a user by using artificial intelligence (AI) technology.

FIG. 10 is a diagram of an operation of an electronic apparatus of identifying a user by using artificial intelligence (AI) technology.

The processor 130 may identify a user of the electronic apparatus 100 by using the artificial intelligence technology. The artificial intelligence technology is a technology in which a computer machine which implements intelligence at a human level learns and determines on its own, and is a technology of which the recognition rate is improved as it is used more. The processor 130 may identify users via deep learning using an algorithm that classifies and learns features of input data on its own.

Referring to FIG. 10, the processor 130 may identify a user based on at least one of a broadcast channel number tuned from the electronic apparatus 100, a broadcast genre, and a channel zapping feature.

For example, when the user tunes in to channel 13 showing a baseball game after displaying an EPG broadcast guide on the electronic apparatus 100, the processor 130 may perform deep learning based on the tuned broadcast channel number, the broadcast genre and the channel zapping feature, and identify that the user is a user A who mostly tunes in to a sports channel via the EPG broadcast guide.

In another example embodiment, when the user zaps channels via a channel up/down button and tunes in to a weekend drama, the processor 130 may identify, through deep learning, that the user is a user B who zaps channels via the channel up/down button and mostly tunes in to drama channels on weekends.

FIG. 10 illustrates that the input data are a tuned broadcast channel number, a broadcast genre, and a channel zapping feature, but the input data are not limited thereto. For example, the input data may further include a use frequency of multi contents, a volume adjustment feature, a speed of channel zapping, and the like.

FIG. 11 is an example embodiment of an operation of an electronic apparatus providing viewing history information.

When the user using the electronic apparatus 100 is identified, the processor 130 may send viewing history information of the identified user to the external apparatus 200.

Meanwhile, as described above, the processor 130 may not only identify a user by means of the artificial intelligence technology but also identify the user based on a feature of the first voice.

In detail, the processor 130 may identify a user by analyzing the feature of the first voice signal from the energy, frequency bandwidth and voice-to-noise ratio of the first voice and comparing a voice feature of each user stored in a storage (not shown) with the feature of the first voice signal.

In more detail, the processor 130 may compare a feature of a voice for each user stored in the storage (not shown) with a feature of the first voice and determine a voice of which the degree of matching is more than a preset threshold, and thereby a user who utters a voice to the microphone 110 of the electronic apparatus 100 can be identified.

Meanwhile, the first voice may be not only a voice (for example, "How is the weather in Seoul tomorrow?" and the like) that the user utters to the microphone 110 of the electronic apparatus 100 to receive information about a particular content, but also an ordinary voice (e.g., conversation with another user, and the like) received in the microphone 110 of the electronic apparatus 100 or a voice received in a microphone of a remote controller or a user terminal.

In a case where a user voice is input to a microphone of a remote controller or a user terminal, the processor 130 may receive a voice signal corresponding to the user voice from the remote controller or the user terminal, convert the voice signal to an analog signal through a digital/analog converter (not shown), and then analyze a feature of the user voice based on the energy, frequency bandwidth and voice-to-noise ratio of the converted analog signal.

In addition, in a case where a user is identified based on a feature of the user voice, the processor 130 may lower or mute a sound volume output from the electronic apparatus 100.

In addition, the processor 130 may remove the sound output from the electronic apparatus 100 or receive only a voice signal of the user. Meanwhile, the sound removing technology is a general technology and thus specific descriptions will be omitted herein. For example, the sound removal may be carried out by changing a particular frequency using a noise gate (not shown).

In addition, when a position of the user inputting the first voice is moved, the processor 130 may send viewing history information of the identified user to the external apparatus 200 at the moved position.

To this end, the electronic apparatus 100 may further include a storage (not shown) which stores viewing history information of a plurality of users. The viewing history information may include various information including information about recently-viewed broadcast programs for each user, information about a broadcast program added to favorites, information about a broadcast program usually viewed by the user in a time zone when an external apparatus is turned on, and the like.

That is, when a position of the user uttering the first voice is moved, the processor 123 may send viewing history information of the identified user from among the viewing history information of a plurality of users stored in the storage (not shown) to the external apparatus 200.

For example, when the identified user is user A, the processor 130 may send viewing history information of the user A from among the viewing history information of the plurality of users stored in the storage (not shown) to the external apparatus 200.

As illustrated in FIG. 11, the viewing history information may include information about broadcast programs recently viewed by the user A. Meanwhile, the recent viewed list of the user A may further include information about a broadcast program viewed by the user A in the external apparatus 200.

To this end, the processor 130 may receive broadcast history information provided by the external apparatus 200 from the external apparatus 200.

Meanwhile, FIG. 11 illustrates that the external apparatus 200 displays the recent viewed list, but the example is not limited thereto. For example, the processor 130 may send the favorite viewing list of the user A to the external apparatus 200, and the external apparatus 200 may display the favorite viewing list of the user A.

FIG. 12 is another example embodiment of an operation of an electronic apparatus providing viewing history information.

As described above, the processor 130 may send the viewing history information of the user A to the external apparatus 200. The processor 130 may send, to the external apparatus 200, a signal requesting to display a UI identifying if information about the user identification result and/or the viewing history information.

For example, as illustrated in FIG. 12, when the user A moves to an area of the external apparatus 200, the processor 130 may send, to the external apparatus 200, a signal requesting to display a UI informing that the user A is sensed and/or a UI identifying whether to receive the recent viewed list of the user A.

The user may quickly tune in to a previously-watched channel through the recent viewed list according to a user selection and enjoy an image or may output an image output before the electronic apparatus 100 is turned off as it is to the external apparatus, and thereby the convenience is enhanced.

Although not illustrated in FIG. 12, the processor 130 may send, to the external apparatus, a signal requesting to display a UI informing that the user is sensed and a UI demanding input of a password set by the user. Accordingly, the personal privacy can be protected.

Meanwhile, in the example embodiment above, it is described that the user identified by the processor 130 moves to an area of the external apparatus 200. However, according to circumstances, in a state that a plurality of users use the electronic apparatus 100, there may be cases where a user different from the user identified by the processor 130 moves to the area of the external apparatus 200.

For example, there may be a case where a first user from among the plurality of users input a voice to the electronic apparatus 100 and, in a state that the processor 130 identifies the first user, a second user different from the first user moves to the area of the external apparatus 200.

The processor 130 may compare a feature of a voice input to the external apparatus 200 with a feature of voices of the plurality of voices stored in the storage (not shown) and identify a second user, and transmit viewing history information of the second user to the external apparatus 200.

In detail, the processor 130 may receive, from the external apparatus 200, a voice signal corresponding to a voice input to the microphone of the external apparatus 200, convert the received voice signal to an analog signal, and then analyze a feature of the voice.

In addition, the processor 130 may identify the second user by comparing the analyzed voice feature with the feature of voices of the plurality of users stored in the storage (not shown).

In addition, the processor 130 may identify a user having moved to the external apparatus 200 by using the artificial intelligence technology described above. For example, in a case where the second user moves to the area of the external apparatus 200 and turns on the external apparatus 200, based on information about the user who watched the image through the external apparatus 200 at the time when the external apparatus 200 is turned on, a priority of a plurality of users registered in the external apparatus 200, and the like, the processor 130 may perform deep learning and identify that the user who turned on the external apparatus 200 is the second user.

Accordingly, the electronic apparatus 100 according to an example embodiment may provide viewing history information relating to a person who uses the external apparatus, and aligns with the user needs.

Figure 13:
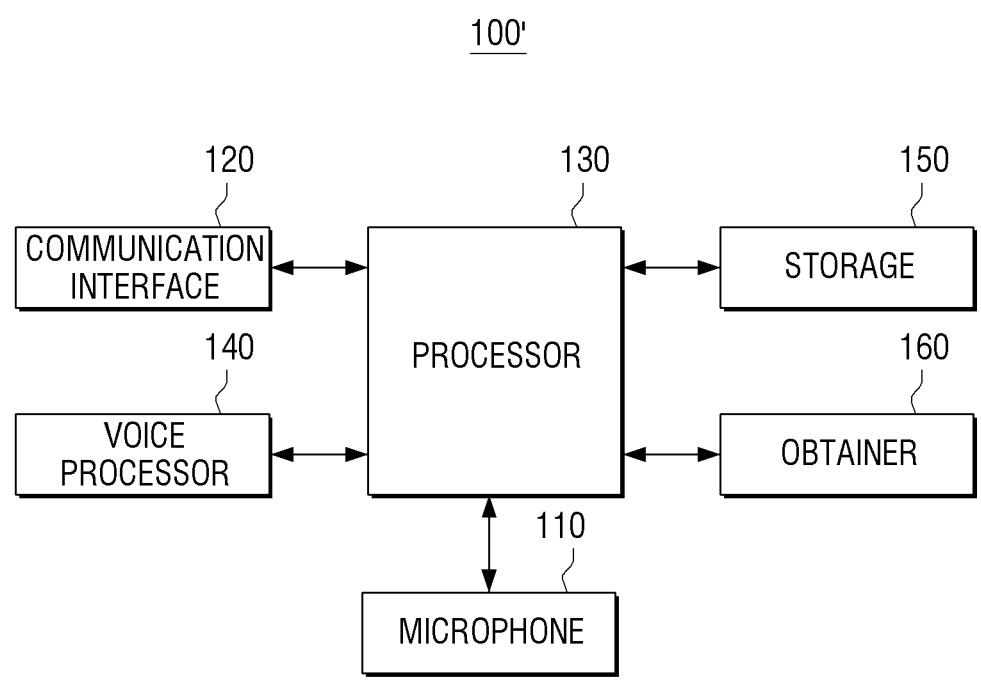
FIG. 13 is another block diagram provided to explain an electronic apparatus, according to an example embodiment.

FIG. 13 is another block diagram provided to explain an electronic apparatus, according to an example embodiment.

Referring to FIG. 13, an electronic apparatus 100' according to an example embodiment may include a microphone 110, a communication interface 120, a processor 130, a voice processor 140, a storage 150, and an obtainer 160. Hereinafter, descriptions of the portion overlapping with the portion described above will be omitted or condensed.

The voice processor 140 may convert a voice received via the microphone 110 into a voice signal, and convert the voice signal into a text. According to an example embodiment, the voice processor 140 may convert the voice signal into a text using a speech to text (STT) algorithm.

The storage 150 may store an operating system (OS) for controlling overall operations of the elements of the electronic apparatus 100' and a command or data related to the elements of the electronic apparatus 100'.

Accordingly, the processor 130 may control a plurality of hardware components or software elements of the electronic apparatus 100' by using diverse commands or data in the storage 150, load and process a command or data received from at least one of the other components in a volatile the memory, and store diverse data in a non-volatile the memory.

In particular, the storage 150 may store utterance history information for the voice received via the microphone 110. The utterance history information is information which is generated based on the voice received via the microphone 110. In detail, the storage 150 may store utterance history information including information about a time at which a voice is received via the microphone 110, information about a response generated based on the received voice, and the like.

The processor 130 controls the overall operations of the electronic apparatus 100'.

In detail, the processor 130 may include a random access memory (RAM) (not shown), a read only memory (ROM) (not shown), a main central processing unit (CPU) (not shown), first through nth interfaces (not shown), and a bus (not shown). Here, the RAM (not shown), the ROM (not shown), the main CPU (not shown), the first through nth interfaces (not shown), etc. may be connected to one another through the bus (not shown).

The obtainer 160 may obtain utterance elements from a voice signal converted to a text. As in the example described above, in a case where a voice signal such as "How is the weather in Seoul tomorrow?" is input, the obtainer 160 may obtain utterance elements "tomorrow", "Seoul", "weather" and "How is?" from the converted text.

Meanwhile, the methods according to various example embodiments of the present disclosure described above can be implemented by only software/hardware upgrade for existing electronic apparatus.

In addition, the various example embodiments of the present disclosure described above may also be performed through an embedded server provided in an electronic apparatus, or an external server.

The controlling method of an electronic apparatus according to the above-described various embodiments may be implemented as a program and stored in various recording media. For example, a computer program that has been processed by various processors and therefore has become capable of executing the aforementioned control methods may be stored in a non-transitory recording medium and be used.

For example, a non-transitory computer readable medium which stores a program for performing the operations of, when a first voice is received via a microphone of an electronic apparatus, providing first response information corresponding to the first voice; and when a user sensing signal is received from an external apparatus, sending the first response information to the external apparatus may be provided.

The non-transitory computer readable medium refers to a medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the present disclosure. The present teaching can be readily applied to other types of apparatuses. Also, the description of the example embodiments is intended to be illustrative, and not to limit the scope of the claims, and many alternatives, modifications, and variations will be apparent to persons having ordinary skill in the art.

What is claimed is:

1. An electronic apparatus comprising:
a sensor;
a microphone configured to receive a user voice;
a communication interface; and
a processor configured to:
based on a first voice signal corresponding to a first voice of a user located in a first area around the electronic apparatus being received through the microphone, obtain a first keyword for executing an operation related to the first voice from the first voice signal, and obtain first response information based on the first keyword while the user located in the first area is sensed by the sensor,
based on a movement of the user moving outside the first area being sensed by the sensor and a user sensing signal being received from an external apparatus through the communication interface as the user moves to a second area around the external apparatus from the first area and the user located in the second area is sensed by the external apparatus, control the communication interface to transmit the first response information to the external apparatus,
based on a second voice signal corresponding to a second voice of the user being received from the external apparatus through the communication interface, obtain a second keyword related to the second voice from the second voice signal,
based on the second voice signal being received within a preset time from when the first voice is received, obtain second response information based on the first response information and the second keyword and control the communication interface to transmit the obtained second response information to the external apparatus, and
based on the second voice signal being received after the preset time from when the first voice is received, obtain third response information based om the second keyword and transmit the third response information to the external apparatus,
wherein the processor is configured to identify the user based on at least one of a channel number of a broadcast channel tuned in to by the electronic apparatus, a broadcast genre of the broadcast channel, and a channel zapping feature of the user, and transmit viewing history information of the identified user to the external apparatus.

2. The electronic apparatus as claimed in claim 1, wherein the first area is a preset area from the electronic apparatus.

3. The electronic apparatus as claimed in claim 1, further comprising:
a camera,
wherein the processor is configured to, based on a movement of the user moving outside of the first area from the first area being sensed through an image captured through the camera and the user sensing signal being received from the external apparatus, transmit the first response information to the external apparatus, and
wherein the first area is a preset area from the electronic apparatus.

4. The electronic apparatus as claimed in claim 1, wherein the processor is configured to, based on the user sensing signal being received from a plurality of external apparatuses and based on the received user sensing signal, identify an external apparatus sensing the user for more than a preset time among the plurality of external apparatuses and transmit the first response information to the identified external apparatus.

5. The electronic apparatus as claimed in claim 1, wherein the user sensing signal is generated based on at least one of an image captured through a camera of the external apparatus, a voice received through a microphone of the external apparatus, and a movement of the user sensed through an infrared ray sensor of the external apparatus.

6. The electronic apparatus as claimed in claim 1, wherein the processor is configured to transmit the first response information and the second voice signal to a server, receive the second response information generated based on the first response information and the second voice signal from the server, and transmit the received second response information to the external apparatus.

7. The electronic apparatus as claimed in claim 1, wherein the processor is configured to, based on the second voice signal being received through the communication interface within the preset time from when the first voice is received, transmit the first response information and the second voice signal to a server, receive the second response information generated based on the first response information and the second voice signal from the server, and transmit the received second response information to the external apparatus, and based on the second voice signal being received through the communication interface after the preset time from when the first voice is received, transmit the second voice signal to the server, receive the third response information corresponding to the second voice signal from the server, and transmit the received third response information to the external apparatus.

8. The electronic apparatus as claimed in claim 1, wherein the processor is configured to, based on a third voice signal corresponding to a third voice received through a microphone of the external apparatus being received from the external apparatus, compare a feature of the first voice with a feature of the third voice, and based on users inputting the first voice and the third voice being a same person, transmit the first response information to the external apparatus.

9. The electronic apparatus as claimed in claim 1, wherein the processor is configured to identify the user based on a feature of the first voice and transmit viewing history information of the identified user to the external apparatus.

10. The electronic apparatus as claimed in claim 1, wherein the processor is configured to transmit, to the external apparatus, information about a content provided by the electronic apparatus, and
wherein the information about the content includes at least one of information about a broadcast channel tuned in to by the electronic apparatus, information about an application being executed in the electronic apparatus, and information about a multimedia content being reproduced in the electronic apparatus.

11. The electronic apparatus as claimed in claim 1, wherein the processor is configured to perform communication with a user terminal and provide a content received from the user terminal, and based on a connection with the user terminal being released and a user terminal sensing signal being received from the external apparatus, transmit information related to the content to the external apparatus.

12. A method for controlling an electronic apparatus, the method comprising:
based on a first voice signal corresponding to a first voice of a user located in a first area around the electronic apparatus being received through a microphone, obtaining a first keyword for executing an operation related to the first voice from the first voice signal;
obtaining first response information based on the first keyword while the user located in the first area is sensed by a sensor of the electronic apparatus;
based on a movement of the user moving outside the first area being sensed by the sensor of the electronic apparatus and a user sensing signal being received from an external apparatus as the user moves to a second area around the external apparatus from the first area and the user located in the second area is sensed by the external apparatus, transmitting the first response information to the external apparatus;
based on a second voice signal corresponding to a second voice of the user being received from the external apparatus through a communication interface, obtaining a second keyword related to the second voice from the second voice signal;
based on the second voice signal being received within a preset time from when the first voice is received, obtaining second response information based on the first response information and the second keyword and transmitting the obtained second response information to the external apparatus;
based on the second voice signal being received from the external apparatus after the preset time from when the first voice is received, obtaining third response information based on the second keyword and transmitting the third response information to the external apparatus, and
identifying the user based on at least one of a channel number of a broadcast channel tuned in to by the electronic apparatus, a broadcast genre of the broadcast channel, and a channel zapping feature of the user, and transmitting viewing history information of the identified user to the external apparatus.

13. The method as claimed in claim 12, wherein the first area is a preset area from the electronic apparatus.

14. The method as claimed in claim 12, wherein the transmitting of the first response information comprises, based on a movement of the user moving outside the first area from the first area being sensed through an image captured through a camera and the user sensing signal being received from the external apparatus, transmitting the first response information to the external apparatus, and
wherein the first area is a preset area from the electronic apparatus.

15. The method as claimed in claim 12, wherein the transmitting of the first response information comprises, based on the user sensing signal being received from a plurality of external apparatuses and based on the received user sensing signal, identifying an external apparatus sensing the user for more than a preset time among the plurality of external apparatuses and transmitting the first response information to the identified external apparatus.

16. The method as claimed in claim 12, wherein the user sensing signal is generated based on at least one of an image captured through a camera of the external apparatus, a voice received through a microphone of the external apparatus, and a movement of the user sensed through an infrared ray sensor of the external apparatus.

* * * * *